(12) United States Patent
Nam et al.

(10) Patent No.: US 9,800,305 B2
(45) Date of Patent: Oct. 24, 2017

(54) TERMINAL AND OPERATION METHOD THEREOF IN MULTI-USER MULTI-INPUT MULTI-OUTPUT SYSTEM

(71) Applicant: Electronics and Telecommunications Research Institute, Daejeon (KR)

(72) Inventors: Junyoung Nam, Daejeon (KR); Wooram Shin, Daejeon (KR); Sung-Hyun Moon, Daejeon (KR); Cheulsoon Kim, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/935,107

(22) Filed: Nov. 6, 2015

(65) Prior Publication Data
US 2016/0134343 A1 May 12, 2016

(30) Foreign Application Priority Data

Nov. 7, 2014 (KR) ........................ 10-2014-0154474
Jan. 27, 2015 (KR) ........................ 10-2015-0013033
Jan. 30, 2015 (KR) ........................ 10-2015-0015557
Nov. 3, 2015 (KR) ........................ 10-2015-0154064

(51) Int. Cl.
*H04L 1/02* (2006.01)
*H04B 7/0452* (2017.01)
*H04B 7/04* (2017.01)
*H04B 7/06* (2006.01)

(52) U.S. Cl.
CPC ......... *H04B 7/0452* (2013.01); *H04B 7/0478* (2013.01); *H04B 7/0639* (2013.01); *H04B 7/0658* (2013.01)

(58) Field of Classification Search
CPC ... H04B 7/0452; H04B 7/0626; H04B 7/0417
USPC ........................................ 375/267, 259, 260
See application file for complete search history.

(56) References Cited

U.S. PATENT DOCUMENTS 8,953,475 B2 * 2/2015 Li ........................ H04J 11/0023
370/252
2010/0035627 A1 2/2010 Hou et al.
2010/0103832 A1 * 4/2010 Zhou .................... H04B 7/0417
370/252

(Continued)

FOREIGN PATENT DOCUMENTS

KR 1020140110759 A 9/2014

OTHER PUBLICATIONS

"Impact of MU-CSI feedback on the EBF/FD-MIMO performance", 3GPP TSG RAN WG1 Meeting, Apr. 20-24, 2015, pp. 1-5.

*Primary Examiner* — Helene Tayong
(74) *Attorney, Agent, or Firm* — William Park & Associates Ltd.

(57) ABSTRACT

Disclosed herein are a terminal and an operation method thereof in a MIMO system. The terminal may use a reference signal for channel state measurement from a base station to calculate a first value that is a ratio of a signal transmitted from the base station to noise and a second value that is a ratio of interference from the base station and the noise. Further, the terminal may generate bit information by comparing a ratio of the second value and the first value with a predetermined threshold value and feedback the first value and the bit information to the base station.

20 Claims, 5 Drawing Sheets

(56) References Cited

U.S. PATENT DOCUMENTS

| | | | |
|---|---|---|---|
| 2010/0195752 A1 | 8/2010 | Lee et al. | |
| 2012/0106470 A1* | 5/2012 | Clerckx | H04B 7/065 370/329 |
| 2012/0147831 A1* | 6/2012 | Golitschek | H04L 1/0026 370/329 |
| 2012/0218913 A1* | 8/2012 | Park | H04B 7/0632 370/252 |
| 2013/0322375 A1* | 12/2013 | Chang | H04W 72/0426 370/329 |
| 2014/0010318 A1* | 1/2014 | Kim | H04B 7/0639 375/267 |
| 2014/0133334 A1* | 5/2014 | Nagata | H04B 7/0452 370/252 |
| 2014/0226735 A1 | 8/2014 | Zhang et al. | |
| 2014/0254517 A1 | 9/2014 | Nam et al. | |
| 2014/0294110 A1 | 10/2014 | Cheong et al. | |

* cited by examiner

TERMINAL AND OPERATION METHOD THEREOF IN MULTI-USER MULTI-INPUT MULTI-OUTPUT SYSTEM

CROSS-REFERENCE TO RELATED APPLICATION

This application claims priority to and the benefit of Korean Patent Application No. 10-2014-0154474, 10-2015-0013033, 10-2015-0015557, and 10-2015-0154064 filed in the Korean Intellectual Property Office on Nov. 7, 2014, Jan. 27, 2015, Jan. 30, 2015, and Nov. 3, 2015, the entire contents of which are incorporated herein by reference.

BACKGROUND OF THE INVENTION (a) Field of the Invention

The present invention relates to a terminal and an operation method thereof in a multi-user multi-input multi-output system.

(b) Description of the Related Art

After 4G, mobile communication systems require a 1000 times higher frequency efficiency, a 1000 times higher energy efficiency, and a 1000 times higher acceptance increase of device due to a rapid increase in data traffic, compared to those of a 4G system such as 3GPP LTE. As physical layer technologies for increasing the frequency efficiency, there are a network MIMO, an interference alignment, a relay network, a heterogeneous network, a large-scale antenna, a multi-user MIMO, etc.

The multi-user MIMO system is a technology for allowing a base station to use the same resource to simultaneously provide services to a plurality of terminals (users) within a single cell. In the multi-user MIMO system, there is a need to obtain channel state information to allow the base station to perform a multi-input multi-output (MIMO) transmission through a plurality of antennas. To obtain the channel state information, many reference signals and radio resources for channel state information feedback are required.

Further, in the multi-user MIMO system, there is a problem in that scheduling and precoding computation complexity is increased due to an increase of the number of users who may be simultaneously accepted The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a terminal and an operation method thereof having advantages of reducing feedback for channel state information in a multi-user MIMO system.

An exemplary embodiment of the present invention provides an operation method of a terminal in a multi-user multi-input multi-output (MIMO) system. The operation method of a terminal may include: receiving a reference signal for channel state measurement from a base station; calculating a first value that is a ratio of a signal transmitted from the base station to the terminal and noise based on the reference signal; calculating a second value that is a ratio of interference from the base station and the noise based on the reference signal; generating bit information by comparing a ratio of the second value and the first value with a predetermined threshold value; and feeding back the first value and the bit information to the base station.

The base station may calculate channel state information for the multi-user MIMO based on the first value and the bit information.

The operation method of a terminal may further include: calculating first channel state information that is the channel state information based on the predetermined threshold value, the number of layers of the base station, and the first value; and feeding back the first channel state information to the base station.

The operation method of a terminal may further include: calculating, by the base station, the channel state information for the multi-user MIMO based on the first value, the bit information, and the first channel state information.

The base station may use the channel state information to perform scheduling for the multi-user MIMO.

The bit information may be one bit information.

The predetermined threshold value may be differently set depending on a distance between the terminal and the base station.

The first channel state information may be calculated depending on the following Equation, $$\frac{SNR_a}{s + (s-1)\gamma SNR_a}$$

In the above equation, $SNR_a$ may be the first value, S may be the number of layers of the base station, and $\gamma$ may be the predetermined threshold value.

Another embodiment of the present invention provides an operation method of a terminal in a multi-user multi-input multi-output (MIMO) system. The operation method of a terminal may include: receiving a reference signal for channel state measurement from a base station; selecting a precoding matrix index (PMI) of the terminal, in a first subset including precoding vectors orthogonal to each other and a second subset including precoding vectors orthogonal to each other; calculating a first value that is a ratio of a signal transmitted from the base station to the terminal and noise based on the reference signal; calculating a second value that is a ratio of interference from the base station to noise based on the reference signal, for a subset to which the selected PMI belongs; and feeding back the first value and the second value from the base station.

The base station may calculate the channel state information for the multi-user MIMO based on the first value and the second value, for the subset to which the selected PMI belongs.

The first subset and the second subset may each be a portion in the whole codebook that is managed by the base station.

The operation method of a terminal may further include: feeding back the selected PMI to the base station.

The base station may use the channel state information to perform scheduling for the multi-user MIMO.

Yet another embodiment of the present invention provides a terminal communicating with a base station operating a multi-user multi-input multi-output (MIMO). The terminal may include: an RF module receiving a reference signal for channel state measurement from a base station; and a processor calculating a first value that is a ratio of a signal transmitted from the base station to the terminal and noise based on the reference signal, calculating a second value that is a ratio of interference from the base station and the noise based on the reference signal, and generating bit information by comparing a ratio of the second value and the first value with a predetermined threshold value.

The RF module may feedback the first value and the bit information to the base station.

The base station may calculate channel state information for the multi-user MIMO based on the first value and the bit information and the base station may use the channel state information to perform scheduling for the multi-user MIMO.

The processor may calculate first channel state information that is the channel state information based on the predetermined threshold value, the number of layers of the base station, and the first value and the RF module may feedback the first channel state information to the base station.

The base station may calculate the channel state information for the multi-user MIMO based on the first value, the bit information, and the first channel state information.

The bit information may be one bit information.

The predetermined threshold value may be differently set depending on a distance between the terminal and the base station.

According to an exemplary embodiment of the present invention, the terminal may not measure and report the channel state information but feeds back the predetermined interference signal intensity to reduce the feedback overhead.

According to another exemplary embodiment of the present invention, it is possible to simplify the feedback information into one bit information to more reduce the feedback overhead.

According to still another exemplary embodiment of the present invention, it is possible to more reduce the feedback overhead by generating the feedback information only for the subset including the precoding vectors orthogonal to each other.

DETAILED DESCRIPTION OF THE EMBODIMENTS

Figure 1:
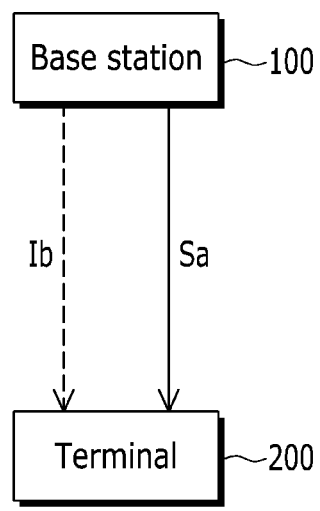
FIG. 1 is a diagram illustrating interference and a signal in a MU-MIMO environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), an user equipment (UE), and the like and may include functions of all or some of the MT, the MS, the AMS, the HR-MS, the SS, the PSS, the AT, the UE, and the like Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include functions of all or some of the ABS, the HR-BS, the nodeB, the eNodeB, the AP, the RAS, the BTS, the MMR-BS, the RS, the HR-RS, AP, RAS, BTS, MMR-BS, RS, HR-RS, and the like.

Now, a terminal and an operation method thereof in a multi-user MIMO system according to an exemplary embodiment of the present invention will be described.

A multi-user MIMO (hereinafter, referred to as 'MU-MIMO') system according to an exemplary embodiment of the present invention includes a base station having M antennas and K users (i.e., terminals) each having N antennas within a single cell. In this case, it is assumed that the base station uses the same resource to simultaneously provide services to a plurality of terminals (users).

Typically, the terminal directly measures and reports channel quality indication (CQI) for the MU-MIMO. That is, typically, the terminal directly calculates the CQI for the MU-MIMO and feeds back the calculated CQI to the base station but the terminal according to the exemplary embodiment of the present invention does not directly calculate the CQI for the MU-MIMO. According to the exemplary embodiment of the present invention, for the base station 100 to estimate the CQI for the MU-MIMO, the terminal feeds back only predetermined information (for example, information on interference signal intensity). The number of cases in which the terminal calculates the CQI for the MU-MIMO is too many, and as a result a burden on the feedback may be increased. Therefore, according to the exemplary embodiment of the present invention, the terminal feeds back only the predetermined information (for example, MUI) to be described below.

Hereinafter, a method for calculating CQI for MU-MIMO according to the exemplary embodiment of the present invention will be described with reference to FIG. 1.

FIG. 1 is a diagram illustrating interference and a signal in a MU-MIMO environment according to an exemplary embodiment of the present invention.

In FIG. 1, it is assumed that the base station 100 uses the same resource to transmit data to a terminal 200 and also transmit data to other terminals (not illustrated) other than the terminal 200 within a cell. In FIG. 1, since a signal transmitted to other terminals within the cell by allowing the base station 100 to use the same resource acts as interference in terms of the terminal 100, the interference is represented by $I_b$. Further, the signal transmitted to the terminal 200 by the base station 100 is represented by $S_a$.

The CQI for the MU-MIMO is called 'MU-CQI' for convenience. Here, the MU-CQI corresponds to a signal interference noise ratio (SINR) of the terminal 200, and therefore the MU-CQI estimated by the base station 100 is defined as the following Equation 1.

$$MU - CQI = SINR = \frac{S_a}{2N + I_b} \quad \text{(Equation 1)}$$

In the above Equation 1, N represents background noise and interference signal intensity due to other cell, constant 2 before N represents that the base station 100 divides power by ½ to transmit a data stream to two terminals using the same resource. Therefore, the constant 2 may be changed depending on the number of terminals which go through the MU-MIMO scheduling. Meanwhile, subscripts a and b represent a precoding matrix index (PMI). For convenience of explanation, in the above Equation 1, it is assumed that the base station 100 simultaneously provides services to the two terminals, but when the services are applied to at least two terminals. other interference signals other than $I_b$ may be added.

As illustrated in the above Equation 1, a denominator represents the noise and the interference signal intensity which are undergone by the terminal 200 and a numerator represents signal intensity received by the terminal 100. In the above Equation 1, when the denominator and the numerator are divided by N, the following Equation 2 is obtained.

$$MU - CQI = \frac{\frac{S_a}{N}}{2 + (I_b/N)} = \frac{SNR_a}{2 + INR_b} \quad \text{(Equation 2)}$$

In the above Equation 2, INR represents a interference-to-noise ratio, which may be replaced by a multi-user interference signal indicator (MUI) defined below. Further, $SNR_a$ represents that a ratio of noise to self signal $S_a$ of a terminal (UE) and corresponds to the CQI (that is, CQI for a single user) used in a typical LTE system. The CQI is represented by $CQI_a$. Therefore, the MU-CQI may finally be represented by the following Equation 3.

$$MU - CQI = \frac{CQI_a}{2 + MUI_b} \quad \text{(Equation 3)}$$

Considering the above Equations 2 and 3, the MUIs for efficient feedback may each be defined as the following Equation 4.

$$MUI_b = I_b/N \quad \text{(Equation 4)}$$

The terminal 200 according to the exemplary embodiment of the present invention calculates information on the $CQI_a$ and the MUI used in the typical LTE system and transmits the calculated information. In other words, the terminal 200 calculates $S_a/N$ that is a ratio of noise N to the signal $S_a$ transmitted to the terminal 200 and feeds back the calculated $S_a/N$ to the base station 100. Further, the terminal 200 calculates $I_b/N$ that is an interference-to-noise ratio from the base station 100 and feeds back the calculated $I_b/N$ to the base station 100. According to the exemplary embodiment of the present invention as described above, it is possible to reduce feedback overhead of the terminal.

The base station 100 uses the $CQI_a$ and $MUI_b$ fed-back from the terminal 200 to finally calculate the MU-CQI depending on the above Equation 3. That is, the base station 100 may use the information ($CQI_a$ and $MUI_b$) fed-back from the terminal 200 to calculate the MU-CQI, thereby estimating an interference level between multi-users. As a result, the base station 100 may perform scheduling and link adaptation for the multi-user.

Meanwhile, the MUI information fed-back to the base station 100 by the terminal 200 may reduce the MUI overhead by the following method. The terminal 200 may simplify the MUI into the one bit information based on a ratio of the MUI and the $SNR_a$ depending on the following Equation 5, having a specific threshold value γ.

$$\text{If } \frac{MUI}{SNR_a} \leq \gamma, MUI \leftarrow '0' \quad \text{(Equation 5)}$$
$$\text{If } \frac{MUI}{SNR_a} > \gamma, MUI \leftarrow '1'$$

As represented in the above Equation 5, if the ratio of the MUI and the $SNR_a$ is equal to or smaller than the threshold value γ, the terminal 200 allocates '0' as the MUI information. Further, when the ratio of the MUI and the $SNR_a$ is larger than the threshold value γ, the terminal 200 allocates '1' as the MUI information. That is, the terminal 200 does not feedback the detailed interference level but divides and feeds back an interference beam having a very small interference level and an interference beam which does not have a very small interference level. As such, the MUI feedback information is reduced to one bit information, and therefore the MUI feedback overhead may be reduced.

Meanwhile, since the MUI is less likely to be 1 in a channel in which spatial correlation (or angular spread) is large and the number of '1s' is very small in the whole bit, in the case of using a compressive sensing technology, the feedback overhead may be more reduced. When a carrier frequency is large in a large-scale antenna system, since the MUI is highly likely to be 1 and the number of '1s' is many in the whole bit, in the case of using the compressive sensing technology, the feedback overhead may be more reduced. Further, adjacent co-PMIs (PMI which may be co-scheduled in the self PMI) based on a chordal distance of the PMI of the terminal 200 show large interference intensity on average, and therefore the terminal 200 may transmit the MUI for the rest PMIs other than the adjacent co-PMI. Therefore, the overhead may be additionally reduced. For this purpose, the base station 100 and the terminal 200 need to share what the adjacent co-PMIs for each PMI are.

Figure 2:
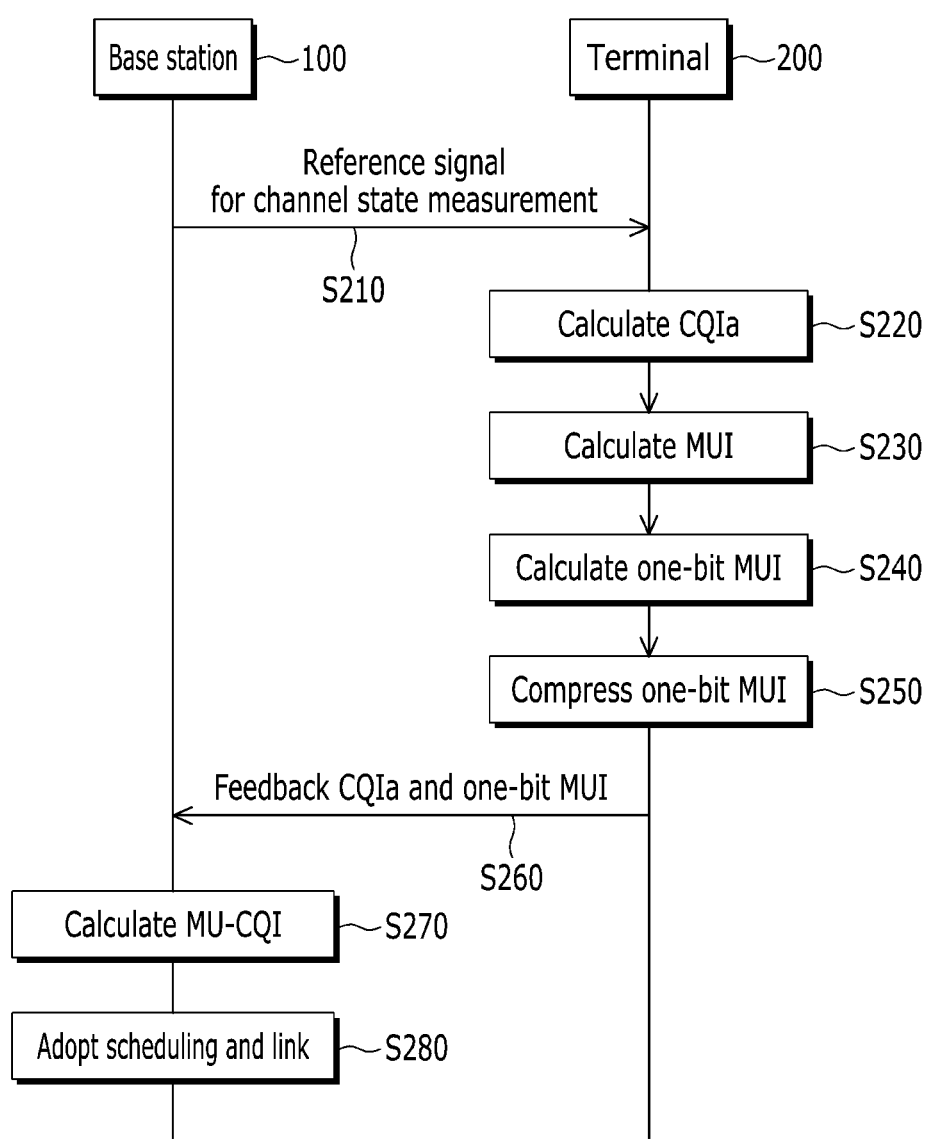
FIG. 2 is a diagram illustrating an operation method of a terminal and a base station in the MU-MIMO system according to the exemplary embodiment of the present invention.

FIG. 2 is a diagram illustrating the operation method of a terminal and a base station in the MU-MIMO system according to the exemplary embodiment of the present invention.

First, the base station 100 transmits a reference signal for channel state measurement to the terminal 200 (S210). Here, the reference signal for the channel state measurement may be channel state information—reference signal (CSI-RS). The CSI-RS may be appreciated by a person having ordinary skill in the art to which the present invention pertains and the detailed description thereof will be omitted.

The terminal 200 uses the reference signal received from the base station 100 to calculate the $CQI_a$ of the above Equation 3 (S220). As described above, the $CQI_a$ is the a ratio of a signal $S_a$ transmitted to the terminal 100 to noise, that is, the $S_a/N$.

Further, the terminal 200 uses the reference signal received from the base station 100 to calculate the MUI of the above Equation 4 (S230). That is, the terminal 200 calculates the MUI which is an interference-to-noise ratio for the rest PMIs other than the PMI selected by the terminal 200 (i.e., interference-to-noise ratio from the base station 100).

The terminal 200 uses the above Equation 5 for the MUI calculated in step S230 to reduce the number of bits (S240). As described above, the number of bits may be one-bit, and therefore is called 'one-bit MUI' below. Further, the terminal 200 may compress the one-bit MUI (S250).

The terminal 200 feeds back the $CQI_a$ and the one-bit MUI (or compressed one-bit MUI) to the base station 100 (S260). Further, the terminal 200 may also feedback the information on the PMI (for example, a in the above Equation 1) selected by the terminal 200 to the base station 100.

The base station 100 uses the $CQI_a$ and the one-bit MUI (or compressed one-bit MUI) which are fed-back from the terminal 200 to calculate the MU-CQI as the above Equation 3 (S270).

Further, the base station 100 uses the MU-CQI calculated in step S270 to perform the scheduling and link adaptation for the multi-user (S280). The base station 100 may select the best multi-user based on the MU-CQI and reduce the interference between the multi-users.

Meanwhile, the one-bit MUI feedback method allows the terminal 200 to feedback the one-bit MUI without directly calculating the MU-CQI and allows the base station 100 to calculate the MU-CQI. The method allows the terminal 200 not to directly calculate the MU-CQI, and therefore the MUI-CQI calculated by the base station 200 may have a slight difference depending on specific receiving algorithms of terminal modem manufacturers. To improve this aspect, the terminal 200 may calculate the supplement MU-CQI (hereinafter, referred to as 'MU-CQI') and feedback the calculated MU-CQI to the base station 100 as described below.

The MUI method described in FIG. 2 allows the base station 100 to schedule the MU-MIMO only in the terminal having a small interference. Therefore, a maximum value of the small interference signal intensity becomes $\gamma*SNR_a$ by the above Equation 5. Therefore, when performing the MU-MIMO scheduling on s layers (the number of data streams transmitted to the same resource by the base station), the interference signal becomes s−1. Further, the terminal 100 may obtain a lower bound of SINR as the following Equation 6 to calculate the MU-CQI' and feedback the calculated MU-CQI' to the base station. The right in Equation 6 corresponds to the supplement MU-CQI (i.e., MU-CQI').

$$\frac{SNR_a}{s + \sum_i INR_i} \geq \frac{SNR_a}{s + (s-1)\gamma SNR_a} \quad \text{(Equation 6)}$$

The left of the above Equation 6 is one obtained by extending the above Equation 2 to s layers and i represents the PMI. s=2, 3, . . . S, in which S corresponds to the maximum number of layers on which the base station 100 performs the MU-MIMO scheduling.

The supplement MU-CQI (i.e., MU-CQI') may be accurately calculated depending on the specific receiving algorithm of the terminal 200 and the terminal 200 feeds back the calculated MU-CQI' to the base station 100. Accordingly, the algorithm related problem of the terminal 200 may be solved.

Meanwhile, the terminal 200 may reduce the feedback overhead of the MU-CQI' as follows. When the number of PMIs which becomes the MUI of '0' in the terminal 200 is S' which is equal to or less than S, the terminal needs not feedback the MU-CQI' corresponding to S−1. Therefore, the terminal 200 may feedback the MU-CQI' corresponding to S'−1 to reduce the overhead. The supplement MU-CQI may be fed-back in a sub-band unit, such that the overall overhead saving effect may be large. However, to remove the obscurity in analyzing the supplement MU-CQI feedback of the terminal by the base station 100, additional information for informing variable S' for each sub-band may be required.

Figure 3:
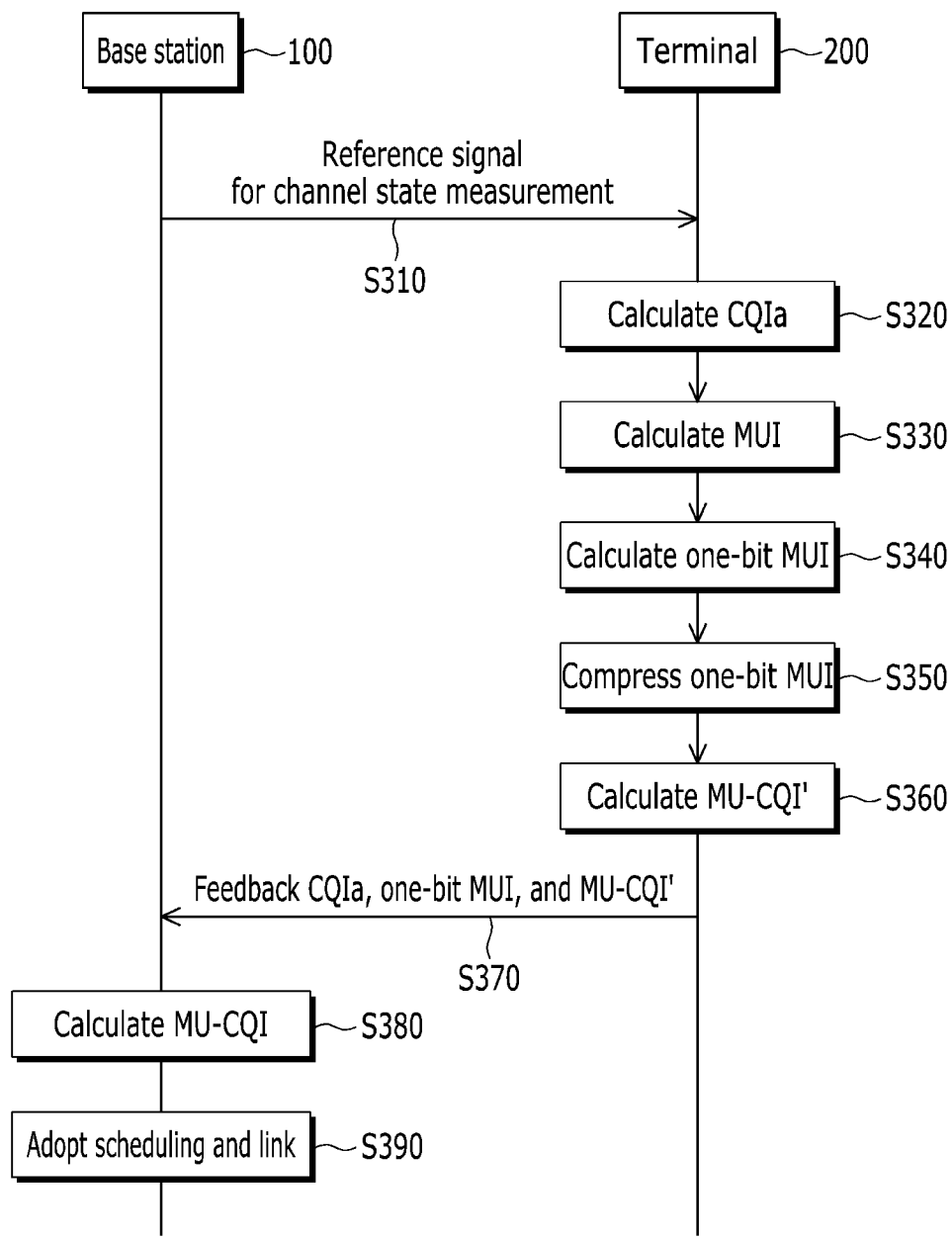
FIG. 3 is a diagram illustrating an operation method of a terminal and a base station in a MU-MIMO system according to another exemplary embodiment of the present invention.

FIG. 3 is a diagram illustrating an operation method of a terminal and a base station in a MU-MIMO system according to another exemplary embodiment of the present invention.

Steps S310, S320, S330, S340, and S350 of FIG. 3 are the same as steps S210, S220, S230, S240, and S250 of FIG. 2, respectively and the detailed description thereof will be omitted.

The terminal 200 uses the above Equation 6 to calculate the supplement MU-CQI (MU-CQI') (S360). That is, the terminal 200 calculates the supplement MU-CQI' which is the interference maximum value for the terminals having small interference.

Further, the terminal 200 feedbacks the $CQI_a$, the one-bit MUI, and the MU-CQI' to the base station 100 (S370).

The base station 100 uses the $CQI_a$, the one-bit MUI, and the MU-CQI' fed-back from the terminal 200 to calculate the MU-CQI as in the above Equation 3, (S380).

Further, the base station 100 uses the MU-CQI calculated in step S380 to perform the scheduling and link adaptation for the multi-user (S390). The base station 100 may select the best multi-user based on the MU-CQI and reduce the interference between the multi-users.

Hereinafter, a method for defining a threshold value γ used in the one-bit MUI feedback will be described. According to the exemplary embodiment of the present invention, the threshold value γ is differently set between a cell boundary terminal and a cell central terminal. The reason is that an inter-cell interference amount between the cell boundary terminal and the cell central terminal is different and therefore the effect of INR on the SINR is different. One example of the method for differently setting a threshold value γ will be described below.

Generally, an SNR difference between modulation coding scheme (MCS) levels corresponds to 1.8 dB.

The threshold value γ is adjusted depending on the following Equation 7. In the following Equation 7, the threshold value γ is represented by I.

$$10\log_{10}\left(\frac{S}{K}\right) - 10\log_{10}\left(\frac{S}{K + (K-1)I/2}\right) \leq 0.4 \text{ dB} \quad \text{(Equation 7)}$$

In the above Equation 7, S corresponds to signal power and K corresponds to the number of users (terminals). As illustrated in the above Equation 7, an SINR loss is equal to or less than 0.4 dB, compared to the case of removing the interference signal. In the above Equation 7, the reason of setting I to ½ is to relieve the whole interference signal of (K−1)/I to 0.5 times since the I is an interference level in the worst case.

In the above Equation 7, S and I have a linear relationship and when I is saturated with 19 dB, the above Equation 7 becomes the following Equation 8. That is, the calculation Equation of the simple threshold value γ (that is, I) satisfying the Equation 7 is the same as the following Equation 8.

$$I(dB)=0.4 \times S(dB)+13_{(dB\ scale)} \quad \text{(Equation 8)}$$

Next, another method for reducing an MUI feedback amount will be described with reference to FIG. 4.

Figure 4:
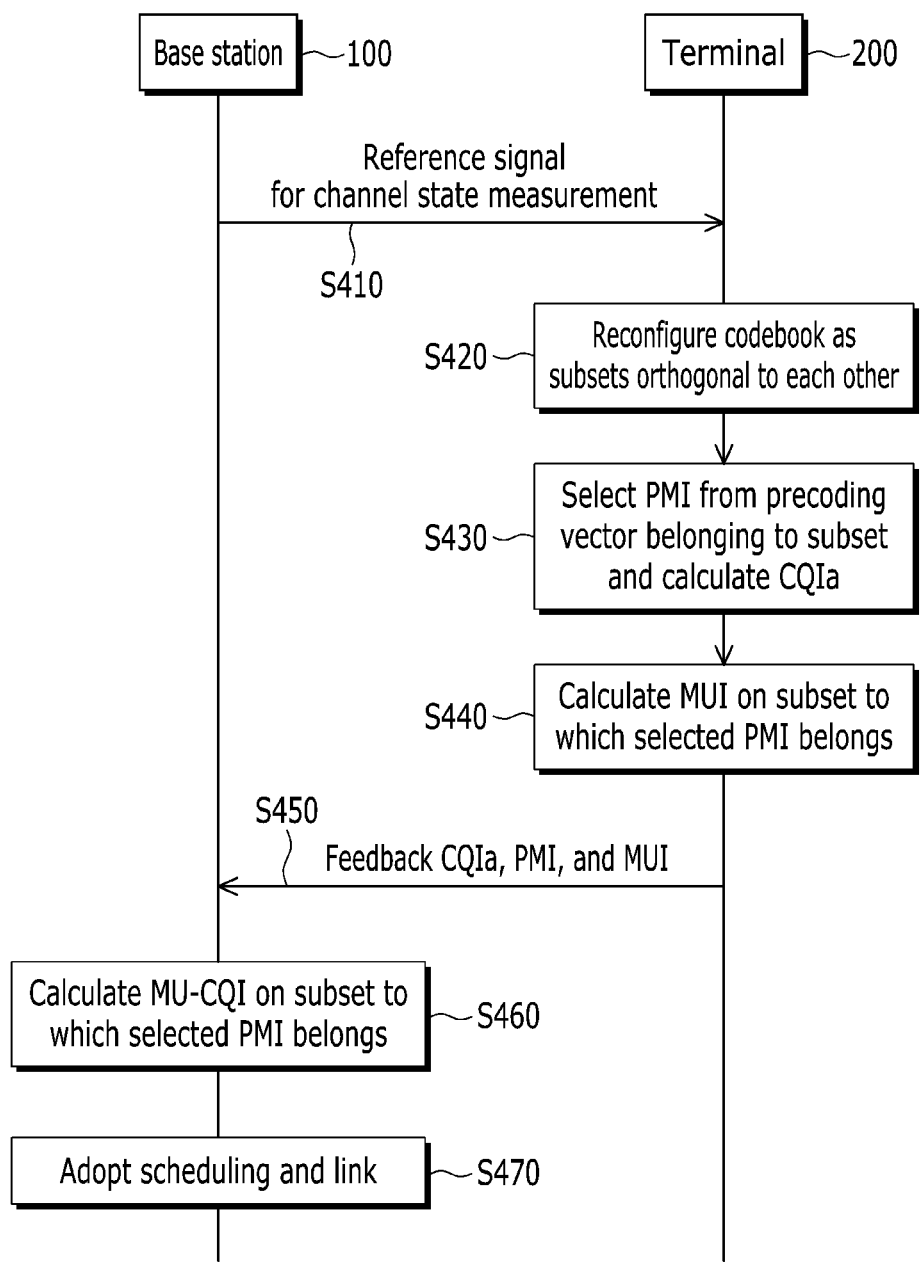
FIG. 4 is a diagram illustrating an operation method of a terminal and a base station in a MU-MIMO system according to still another exemplary embodiment of the present invention.

FIG. 4 is a diagram illustrating an operation method of a terminal and a base station in a MU-MIMO system according to still another exemplary embodiment of the present invention.

First, the base station 100 transmits the reference signal for the channel state measurement to the terminal 200 (S410). Here, the reference signal for the channel state measurement may be the channel state information—reference signal (CSI-RS). The CSI-RS may be appreciated by a person having ordinary skill in the art to which the present invention pertains and the detailed description thereof will be omitted.

The terminal 200 reconfigures a subset consisting of precoding vectors orthogonal to each other in the whole codebook (S420). As an example, the case of using a double codebook of an LTE Rel-10 will be described below. The whole codebook C orthogonal to each other in the double codebook of the LTE Rel-10 is C={$W_{0,0}$, $W_{0,1}$, ..., $W_{7,0}$, $W_{7,1}$}, a subset {$W_{0,0}$, $W_{0,1}$, $W_{2,0}$, $W_{2,1}$, $W_{4,0}$, $W_{4,1}$, $W_{6,0}$, $W_{6,1}$} is orthogonal to each other, and a subset is {$W_{1,0}$, $W_{1,1}$, $W_{3,0}$, $W_{3,1}$, $W_{5,0}$, $W_{5,1}$, $W_{7,0}$, $W_{7,1}$} orthogonal to each other. In the following description, a subset {$W_{0,0}$, $W_{0,1}$, $W_{2,0}$, $W_{2,1}$, $W_{4,0}$, $W_{4,1}$, $W_{6,0}$, $W_{6,1}$} is called G1 and a subset {$W_{1,0}$, $W_{1,1}$, $W_{3,0}$, $W_{3,1}$, $W_{5,0}$, $W_{5,1}$, $W_{7,0}$, $W_{7,1}$} is called G2. The subset becomes a co-MPI (PMI to candidate set which may be co-scheduled in the self PMI) for the MUI configuration.

Next, the terminal 200 selects its own PMI from the precoding vectors belonging to the subset and calculates the $CQI_a$ (S430). That is, the terminal 100 selects its own PMI from the precoding vectors belonging to the subset G1 and the subset G2 and calculates the $CQI_a$.

The terminal 200 calculates the MUI for the subset to which the PMI selected in step S430 belongs as an object (S440). That is, the terminal 200 does not calculate the MUI for the whole subsets G1 and G2 but calculates the MUI only for the subset (for example, G1) to which the PMI selected by the terminal 200 belongs. Here, the method for calculating an MUI is the same as FIG. 2 and therefore the detailed description thereof will be omitted. Meanwhile, the terminal 200 may calculate the one-bit MUI for the subset (for example, G1) to which the PMI selected by the terminal 200 belongs.

The terminal 200 feeds back the $CQI_a$, the PMI selected by the terminal 200, and the MUI calculated in the step S440 (S450).

The base station 100 uses the information fed-back in step S450 to calculate the MU-CQI (S460). That is, the base station 100 uses the information fed-back in the step S450 to calculate the MU-CQI for the subset G1 to which the PMI selected by the terminal 200 belongs. Here, the method for calculating an MUI is the same as FIG. 2 and therefore the detailed description thereof will be omitted.

Further, the base station 100 uses the MU-CQI calculated in the step S460 to perform the scheduling and link adaptation for the multi-user (S470). The base station 100 may select the best multi-user from the group (for example, G1) orthogonal to each other, such that the interference between the multi-users may be more reduced. Further, the terminal calculates only the MUI for the subsets and feedbacks the calculated MUI, such that the computation and the feedback amount may be more reduced.

Meanwhile, as an alternative plan of the MUI feedback technology as described above, the terminal 200 may additionally feedback the interference signal level other than the MU-CQI feedback and the base station 100 may reconfigure the MUI to perform flexible scheduling similar to the MUI.

Figure 5:
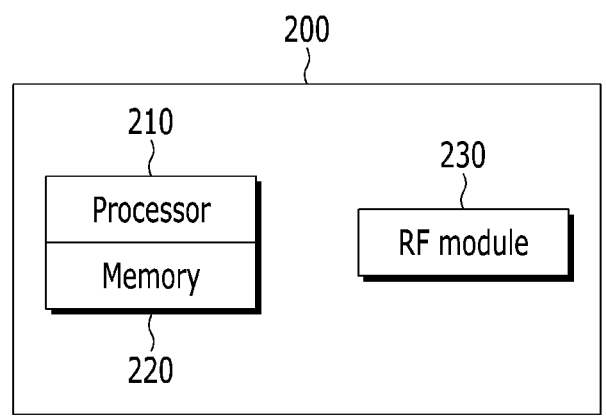
FIG. 5 is a diagram illustrating a terminal according to an exemplary embodiment of the present invention.

FIG. 5 is a diagram illustrating a terminal according to an exemplary embodiment of the present invention.

As illustrated in FIG. 5, the terminal 200 according to the exemplary embodiment of the present invention includes a processor 210, a memory 220, and an RF module 230.

The processor 210 may be configured to implement procedures, methods, and functions described with reference to FIGS. 1 to 4.

The memory 220 is connected to the processor 210 and stores various types of information related to the operation of the processor 210.

The RF module 230 is connected to the antenna (not illustrated) and transmits or receives a radio signal. Further, the antenna may be implemented as a single antenna or a MIMO antenna.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An operation method of a terminal in a multi-user multi-input multi-output (MIMO) system, the terminal comprising a processor configured to process by:
   receiving a reference signal for channel state measurement from a base station;
   calculating a first value that is a ratio of a signal transmitted from the base station to the terminal and noise based on the reference signal;
   calculating a second value that is a ratio of interference from the base station and noise based on the reference signal;
   generating bit information by comparing a ratio of the second value and the first value with a predetermined threshold value; and
   feeding back the first value and the bit information to the base station,
   wherein the second value does not include an information corresponding to a precoding matrix index (PMI) for the terminal itself.

2. The operation method of claim 1, wherein: the base station is configured to process by calculating channel state information for the multi-user MIMO based on the first value and the bit information.

3. The operation method of claim 1, wherein the processor is further configured to process by:
   calculating first channel state information that is channel state information based on the predetermined threshold value, a number of layers of the base station, and the first value; and feeding back the first channel state information to the base station.

4. The operation method of claim 3, wherein the base station is further configured to process by calculating the channel information for the multi-user MIMO based on the first value, the bit information, and the first channel state information.

5. The operation method of claim 2, wherein: the base station uses the channel state information to perform scheduling for the multi-user MIMO.

6. The operation method of claim 1, wherein: the bit information is one bit information.

7. The operation method of claim 1, wherein: the predetermined threshold value is differently set depending on a distance between the terminal and the base station.

8. The operation method of claim 3,
wherein: the first channel state information is calculated depending on the following Equation, $$\frac{SNR_a}{s + (s-1)\gamma SNR_a}$$

in the above equation, $SNR_a$ is the first value, S is the number of layers of the base station, and $\gamma$ is the predetermined threshold value.

9. An operation method of a terminal in a multi-user multi-input multi-output (MIMO) system, the terminal comprising a processor configured to process by:
receiving a reference signal for channel state measurement from a base station;
selecting a precoding matrix index (PMI) of the terminal, in a first subset including precoding vectors orthogonal to each other and a second subset including precoding vectors orthogonal to each other;
calculating a first value that is a ratio of a signal transmitted from the base station to the terminal and noise based on the reference signal;
calculating a second value that is a ratio of interference from the base station to noise based on the reference signal, for a subset to which the selected PMI belongs; and
feeding back the first value and the second value to the base station,
wherein the second value does not include an information corresponding to a PMI for the terminal itself.

10. The operation method of claim 9, wherein: the base station is configured to process by calculating channel state information for the multi-user MIMO based on the first value and the second value, for the subset to which the selected PMI belongs.

11. The operation method of claim 9, wherein: the first subset and the second subset each are a portion in an entire codebook that is managed by the base station program code.

12. The operation method of claim 9, wherein the processor is further configured to feed back the selected PMI to the base station.

13. The operation method of claim 10, wherein: the base station uses the channel state information to perform scheduling for the multi-user MIMO.

14. A terminal communicating with a base station operating a multi-user multi-input multi-output (MIMO), comprising:
one or more processors configured to:
receive a reference signal for channel state measurement from the base station; and
calculate a first value that is a ratio of a signal transmitted from the base station to the terminal and noise based on the reference signal, calculate a second value that is a ratio of interference from the base station and noise based on the reference signal, and generate bit information by comparing a ratio of the second value and the first value with a predetermined threshold value,
wherein the second value does not include an information corresponding to a precoding matrix index (PMI) for the terminal itself.

15. The terminal of claim 14, wherein: the first value and the bit information is fed back to the base station.

16. The terminal of claim 15, wherein:
the base station is configured to process by:
calculating channel state information for the multi-user MIMO based on the first value and the bit information, and
using the channel state information to perform scheduling for the multi-user MIMO.

17. The terminal of claim 14, wherein: the processor is further configured to process by:
calculating first channel state information that is channel state information based on the predetermined threshold value, a number of layers of the base station, and the first value, and feeding back the first channel state information to the base station.

18. The terminal of claim 17, wherein: the base station is further configured to process by calculating the channel state information for the multi-user MIMO based on the first value, the bit information, and the first channel state information.

19. The terminal of claim 14, wherein: the bit information is one bit information.

20. The terminal of claim 14, wherein: the predetermined threshold value is differently set depending on a distance between the terminal and the base station.

* * * * *